(12) United States Patent
Fujisawa et al.

(10) Patent No.: US 9,674,611 B2
(45) Date of Patent: Jun. 6, 2017

(54) INFORMATION PROCESSOR, AUDIO PROCESSOR, AUDIO PROCESSING SYSTEM, PROGRAM, AND VIDEO GAME PROGRAM

(75) Inventors: Morishige Fujisawa, Hamamatsu (JP); Noriyuki Ohashi, Hamamatsu (JP); Hirochika Maegaki, Hamamatsu (JP); Yoshinori Tsuchida, Shinjuku (JP); Tomohiro Yajima, Shinjuku (JP)

(73) Assignees: YAMAHA CORPORATION, Hamamatsu-shi (JP); KABUSHIKI KAISHA SQUARE ENIX, Tokyo (JP)

( * ) Notice: Subject to any disclaimer, the term of this patent is extended or adjusted under 35 U.S.C. 154(b) by 359 days.

(21) Appl. No.: 13/819,814

(22) PCT Filed: Aug. 30, 2011

(86) PCT No.: PCT/JP2011/069648
§ 371 (c)(1),
(2), (4) Date: Feb. 28, 2013

(87) PCT Pub. No.: WO2012/029807
PCT Pub. Date: Mar. 8, 2012

(65) Prior Publication Data
US 2013/0170650 A1   Jul. 4, 2013

(30) Foreign Application Priority Data

Aug. 30, 2010   (JP) ................................. 2010-192942

(51) Int. Cl.
*H04R 5/00*   (2006.01)
*H04S 3/00*   (2006.01)
(Continued)

(52) U.S. Cl.
CPC ............... *H04R 5/00* (2013.01); *A63F 13/54* (2014.09); *H04S 3/008* (2013.01); *A63F 2300/6081* (2013.01); *H04S 7/305* (2013.01)

(58) Field of Classification Search
CPC . H04R 5/00; H04S 3/008; H04S 7/305; H04S 7/30; A63F 13/54; A63F 2200/6081; A63F 2300/6063; G10H 2220/315
See application file for complete search history.

(56) References Cited

U.S. PATENT DOCUMENTS 4,030,129 A * 6/1977 Whitlock ......... G11B 20/00992
                                                360/32
5,822,438 A * 10/1998 Sekine et al. .................. 381/17
(Continued)

FOREIGN PATENT DOCUMENTS

EP    1565035 A2   8/2005
GB    2457508 A    8/2009
(Continued)

OTHER PUBLICATIONS

International Search Report issued in PCT/JP2011/069648 dated Sep. 27, 2011. English translation provided.
(Continued)

*Primary Examiner* — Andrew L Sniezek
(74) *Attorney, Agent, or Firm* — Rossi, Kimms & McDowell LLP

(57) ABSTRACT

An information processor includes a generator that is adapted to generate original sound data indicating an original sound as a basis for a processed sound to be heard by a user and a parameter indicating a content of processing on the original sound data, an original sound data output section that is adapted to output the original sound data generated by the generator from any channel of a plurality of channels, and a control signal output section that is adapted to output a control signal including the parameter and a correspon-
(Continued)

dence relationship between the parameter and the channel for the original sound data to be processed by means of the parameter.

7 Claims, 5 Drawing Sheets

(51) Int. Cl.
  *A63F 13/54* (2014.01)
  *H04S 7/00* (2006.01)

(56) References Cited

U.S. PATENT DOCUMENTS

| | | | |
|---|---|---|---|
| 5,993,318 | A * | 11/1999 | Kousaki .................... 463/35 |
| 6,540,613 | B2 | 4/2003 | Okubo et al. |
| 6,572,475 | B1 | 6/2003 | Okabe et al. |
| 7,492,915 | B2 | 2/2009 | Jahnke |
| 7,563,168 | B2 * | 7/2009 | Jahnke .................... 463/35 |
| 8,932,134 | B2 | 1/2015 | Andall |
| 9,197,977 | B2 | 11/2015 | Mahabub et al. |
| 9,294,854 | B2 | 3/2016 | Fujisawa et al. |
| 2001/0023202 | A1 | 9/2001 | Okubo |
| 2003/0045956 | A1 | 3/2003 | Comair et al. |
| 2005/0179701 | A1 | 8/2005 | Jahnke |
| 2005/0220309 | A1 | 10/2005 | Hirata et al. |
| 2008/0273721 | A1 | 11/2008 | Walsh |
| 2010/0235166 | A1 | 9/2010 | Bardino et al. |
| 2010/0323793 | A1 | 12/2010 | Andall |
| 2015/0088530 | A1 | 3/2015 | Oh et al. |
| 2016/0119736 | A1 | 4/2016 | Fujisawa et al. |

FOREIGN PATENT DOCUMENTS

| | | |
|---|---|---|
| JP | H03125600 A | 5/1991 |
| JP | H03258176 A | 11/1991 |
| JP | H07222299 A | 8/1995 |
| JP | 08-243254 A | 9/1996 |
| JP | 2001-252467 A | 9/2001 |
| JP | 2005202052 A | 7/2005 |
| JP | 2005286903 A | 10/2005 |
| JP | 2006033551 A | 2/2006 |
| JP | 2006267226 A | 10/2006 |
| JP | 2008245984 A | 10/2008 |
| JP | 2009-027601 A | 2/2009 |
| JP | 2010-507123 A | 3/2010 |
| JP | 2010118838 A | 5/2010 |
| JP | 2010520671 A | 6/2010 |
| WO | 2007083958 A1 | 7/2007 |

OTHER PUBLICATIONS

Official Action issued in CN201180042052.X mailed Sep. 3, 2014. English translation provided.
Office Action issued CN201180042052.X, mailed Jul. 10, 2015. English translation provided.
Office Action issued in CN201180042052.X, mailed Nov. 10, 2015. English translation provided.
Chinese Office Action issued in Chinese counterpart application No. CN201180042052.X, dated Apr. 7, 2015. English translation provided.
Extended Search Report issued in European Appln. No. 11821822.1 mailed Mar. 8, 2016.
Office Action issued in Chinese Appin. No. 201180042052.X mailed on May 12, 2016. English translation provided.
Extended European Search Report issued in European Appln. No. 11821823.9 mailed Oct. 14, 2016.
Office Action issued in Japanese Appln. No. 2015-077488 mailed Jan. 19, 2016. English translation provided.
Office Action issued in Japanese Appln. No. 2010-192968 mailed Oct. 22, 2013. English translation provided.
International Search Report issued in Intl. Appln. No. PCT/JP2011/069649 mailed Oct. 4, 2011. English translation provided.
Office Action issued in U.S. Appl. No. 13/819,794 mailed Mar. 6, 2015.
Notice of Allowance issued in U.S. Appl. No. 13/819,794, mailed Oct. 7, 2015.
Office Action issued in U.S. Appl. No. 14/989,136 mailed Dec. 16, 2016.

* cited by examiner

| t=0.0 | | | | |
|---|---|---|---|---|
| ch | TYPE | LOCALIZATION | REVERBERATION RATE | BIT RATE |
| ch1 | BGM(L) | 45 DEGREES | 12% | 128kbps |
| ch2 | BGM(R) | -45 DEGREES | 12% | 128kbps |
| ch3 | SE | 90 DEGREES | 41% | 64kbps |
| ch4 | SYS | 0 DEGREE | 0% | 64kbps |
| ch5 | VO | 0 DEGREE | 0% | 64kbps |

(b)

| t=2.5 | | | | |
|---|---|---|---|---|
| ch | TYPE | LOCALIZATION | REVERBERATION RATE | BIT RATE |
| ch1 | BGM(L) | 45 DEGREES | 12% | 128kbps |
| ch2 | BGM(R) | -45 DEGREES | 12% | 128kbps |
| ch3 | SE | *30 DEGREES* | *12%* | 64kbps |
| ch4 | SYS | 0 DEGREE | 0% | 64kbps |
| ch5 | VO | *135 DEGREES* | 0% | 64kbps |

(c)

| t=10.0 | | | | |
|---|---|---|---|---|
| ch | TYPE | LOCALIZATION | REVERBERATION RATE | BIT RATE |
| ch1 | BGM(L) | 45 DEGREES | *0%* | 128kbps |
| ch2 | BGM(R) | -45 DEGREES | *0%* | 128kbps |
| ch3 | *BGM(SL)* | *135 DEGREES* | *0%* | *128kbps* |
| ch4 | *BGM(SR)* | *-135 DEGREES* | 0% | *128kbps* |
| ch5 | | | | |

INFORMATION PROCESSOR, AUDIO PROCESSOR, AUDIO PROCESSING SYSTEM, PROGRAM, AND VIDEO GAME PROGRAM

TECHNICAL FIELD

The present invention relates to an audio processing technique for use when contents, such as video game software, are expressed using a computer.

BACKGROUND ART

As video game software (hereinafter, referred to as video game software) which is executed by a specialized video game machine (hereinafter, referred to as a video game machine) with an embedded computer, a personal computer, or the like, there is video game software which expresses a three-dimensional space or reproduces a motion image according to the progress of the video game. There is also a reproducer which reproduces video content recorded in a commercially available DVD (Digital Versatile Disc) video, Blu-ray (Registered Trademark) disc video, or the like (hereinafter, referred to as DVD video or the like) depending on user's operation.

A video game machine which executes video game software or a reproducer which reproduces video content is an information processor which performs information processing. In general, the information processor is connected to an amplifier including a sound emission device, such as a speaker, and transmits a sound signal to the amplifier such that sound is synchronized with video of the content. Although many information processors mix sound such that a sound field is formed in accordance with the standard audio environment defined in advance over all contents and then transmit the sound to the amplifier, an information processor which changes a sense of sound field in accordance with the progress of a content to obtain a sense of reality or a sense of strong impact has been developed. For example, Patent Literature 1 discloses a technique which switches the effects of reproduced sound in accordance with the progress of a video game.

CITATION LIST

Patent Literature

Patent Literature 1: JP-A-8-243254

SUMMARY OF INVENTION

Technical Problem

However, according to the technique of Patent Literature 1, while the sound field changes when the conditions relating to the progress of the video game are satisfied, there are various kinds of sound, such as operation sound, ambient sound, and BGM (background music), and the same sound field is applied to the plurality of types of sound without exception. For this reason, in the technique of Patent Literature 1, the desired sound effect is not obtained depending on the type of sound or the sound emission conditions.

An object of the invention is to individually process and emit sound at a destination at which original sound data indicating original sound is output.

Solution to Problem

In order to solve the problem as mentioned above, an information processor according to the invention includes: a generator that is adapted to generate original sound data indicating an original sound as a basis for a processed sound to be heard by a user and a parameter indicating a content of processing on the original sound data; an original sound data output section that is adapted to output the original sound data generated by the generator from any channel of a plurality of channels; and a control signal output section that is adapted to output a control signal including the parameter and a correspondence relationship between the parameter and the channel for the original sound data to be processed by means of the parameter.

Preferably, the generator is adapted to generate plural pieces of original sound data, and an individual parameter indicating a content of processing on each piece of original sound data, and the original sound data output section is adapted to output the plural pieces of original sound data generated by the generator to respective channels.

Preferably, a video game progressing section is further included that is adapted to progress a video game, and the generator is adapted to generate the original sound data according to a progress of the video game progressed by the video game progressing section and the parameter for the original sound data.

Preferably, the video game progressing section is adapted to progress the video game depending on user's operation.

Preferably, a sound emission condition acquirer is included that is adapted to acquire sound emission conditions of a sound emission device, which is forced to emit sound by an audio processor, from the audio processor serving as an output destination at which the original sound data output section outputs the original sound data, and the generator is adapted to generate the parameter depending on the sound emission conditions acquired by the sound emission condition acquirer and the progress of the video game.

An audio processor according to the invention includes: an original sound data acquirer that is adapted to acquire original sound data indicating an original sound as a basis for a processed sound to be heard by a user from any channel of a plurality of channels; a control signal acquirer that is adapted to acquire a control signal including a parameter indicating a content of processing on the original sound data and a correspondence relationship between the parameter and the channel for the original sound data to be processed by means of the parameter; and a processing section that is adapted to process the original sound data acquired from the channel according to the content of processing indicated by the parameter associated with the channel by means of the control signal acquired by the control signal acquirer.

An audio processing system according to the invention includes the information processor and the audio processor.

A program according to the invention is a program which causes a computer to function as: a generator that is adapted to generate original sound data indicating an original sound as a basis for a processed sound to be heard by a user and a parameter indicating a content of processing on the original sound data; an original sound data output section that is adapted to output the original sound data generated by the generator from any channel of a plurality of channels; and a control signal output section that is adapted to output a control signal including the parameter and a correspondence relationship between the parameter and the channel for the original sound data to be processed by means of the parameter.

A video program according to the invention is a video game program which causes a computer as a video game machine to function as: a video game progressing section that is adapted to operate a game character in a virtual space depending on user's operation to progress a video game; an original sound data generator that is adapted to calculate and generate original sound data indicating an original sound as a basis for processed sound to be heard by the user set for a sound generating object based on a relationship between a hearing position set in correspondence with the game character and the sound generating object disposed in the virtual space; a parameter generator that is adapted to generate a parameter indicating a content of processing on the original sound data generated by the original sound data generator in accordance with the progress of the video game progressed by the video game progressing section; an original sound data output section that is adapted to output the original sound data generated by the original sound data generator from any channel of a plurality of channels; and a control signal output section that is adapted to output a control signal including the parameter and a correspondence relationship between the parameter and the channel for the original sound data to be processed by means of the parameter.

A program according to the invention is a program which causes a computer to function as: an original sound data acquirer that is adapted to acquire original sound data indicating an original sound as a basis for a processed sound to be heard by a user from any channel of a plurality of channels; a control signal acquirer that is adapted to acquire a control signal including a parameter indicating a content of processing on the original sound data and a correspondence relationship between the parameter and the channel for the original sound data to be processed by means of the parameter; and a processing section that is adapted to process the original sound data acquired from the channel according to the content of processing indicated by the parameter associated with the channel by means of the control signal acquired by the control signal acquirer.

Advantageous Effects of Invention

According to the invention, it is possible to individually process and emit sound at a destination at which original sound data indicating original sound is output.

BRIEF DESCRIPTION OF DRAWINGS

FIG. 4 is a diagram showing an example of a control signal which is transmitted from a channel ct of an output unit 15.

DESCRIPTION OF EMBODIMENTS

1. Configuration 1-1. Overall Configuration of System

Figure 1:
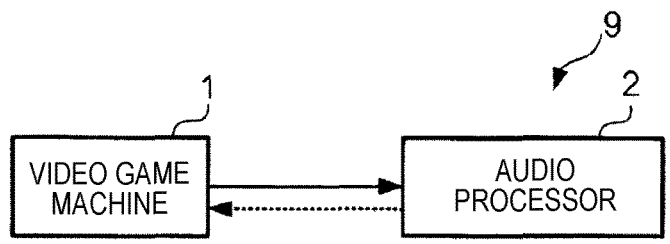
FIG. 1 is a diagram showing the configuration of an audio system 9 according to an embodiment of the invention.

FIG. 1 is a diagram showing the configuration of an audio system 9 according to an embodiment of the invention. The audio system 9 includes a video game machine 1 and an audio processor 2. The video game machine 1 and the audio processor 2 are connected together by a multi-channel communication cable in accordance with a standard, such as HDMI (High-Definition Multimedia Interface; Registered Trademark). The term "channel" means a transmission path through which data is transmitted, and the term "multi-channel communication cable" means a communication cable which has a plurality of separate channels. The video game machine 1 is an example of an information processor which reproduces software or contents. The video game machine 1 and the audio processor 2 are able to exchange information with each other, and while the transfer of information from the audio processor 2 to the video game machine 1 can be performed as indicated by a broken line in FIG. 1, this will be omitted in the following description of the embodiment.

1-2. Configuration of Video Game Machine

Figure 2:
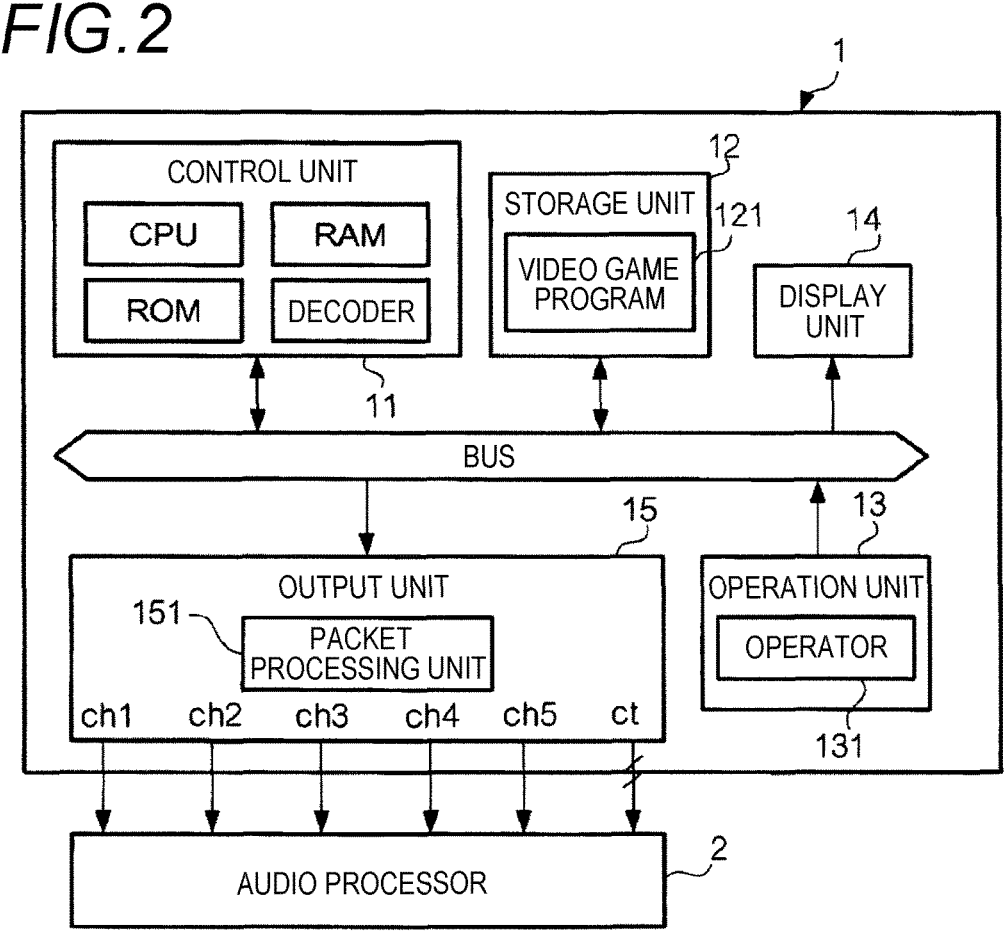
FIG. 2 is a diagram showing the configuration of a video game machine 1.

FIG. 2 is a diagram showing the configuration of the video game machine 1. A control unit 11 has a CPU (Central Processing Unit), a ROM (Read Only Memory), and a RAM (Random Access Memory), and controls the respective units of the video game machine 1 using the CPU which reads and executes a boot loader stored in the ROM or various programs stored in a storage unit 12 on the RAM. The control unit 11 includes a decoder which decompresses motion images and sound data compressed in accordance with the standard, such as MPEG2 or MPEG4, and generates uncompressed PCM (pulse code modulation) data. The decoder may be realized by a specialized processor which is hardware different from the CPU or may be realized by the CPU which executes a program. The control unit 11 functions as, for example, a video game progression unit 110, an original sound data generation unit 111, or the like.

The storage unit 12 is high-capacity storage means, such as a hard disk drive, and stores various programs which are read into the control unit 11. A video game program 121 is one of various programs. The storage unit 12 may be a recording medium, such as an external nonvolatile memory. In this case, the storage unit 12 is connected to the video game machine 1 through a connection interface (not shown) or the like. The storage unit 12 may include a reader which reads a recording medium, such as an optical disk. In this case, the storage unit 12 may read a recording medium loaded in the reader, and if the recording medium is rewritable, may perform rewriting on the recording medium.

An operation unit 13 includes an operator 131 which gives various instructions. The operation unit 13 receives user operation and supplies an operation signal according to the operation content to the control unit 11.

The display unit 14 includes, for example, a display, such as a liquid crystal display, and displays video according to the progress of a video game under the control of the control unit 11.

An output unit 15 is an interface which sends a plurality of pieces of sound data and control signals to the audio processor 2 such that a plurality of kinds of sound according to the progress of the video game are emitted to the audio processor 2 under the control of the control unit 11. The output unit 15 includes a packet processing unit 151. The packet processing unit 151 divides sound data in terms of audio frames as a unit of sound reproduction, and adds a header including a time stamp indicating a reproduction time, or the like to form packets.

The output unit 15 is connected to the audio processor 2 through the multi-channel communication cable. The communication cable has six channels. A control signal is output to one channel ct from among the channels, and the packetized sound data is transmitted to the remaining five channels ch1 to ch5. The details of the control signal will be described below.

1-3. Functional Configuration of Video Game Machine

Figure 3:
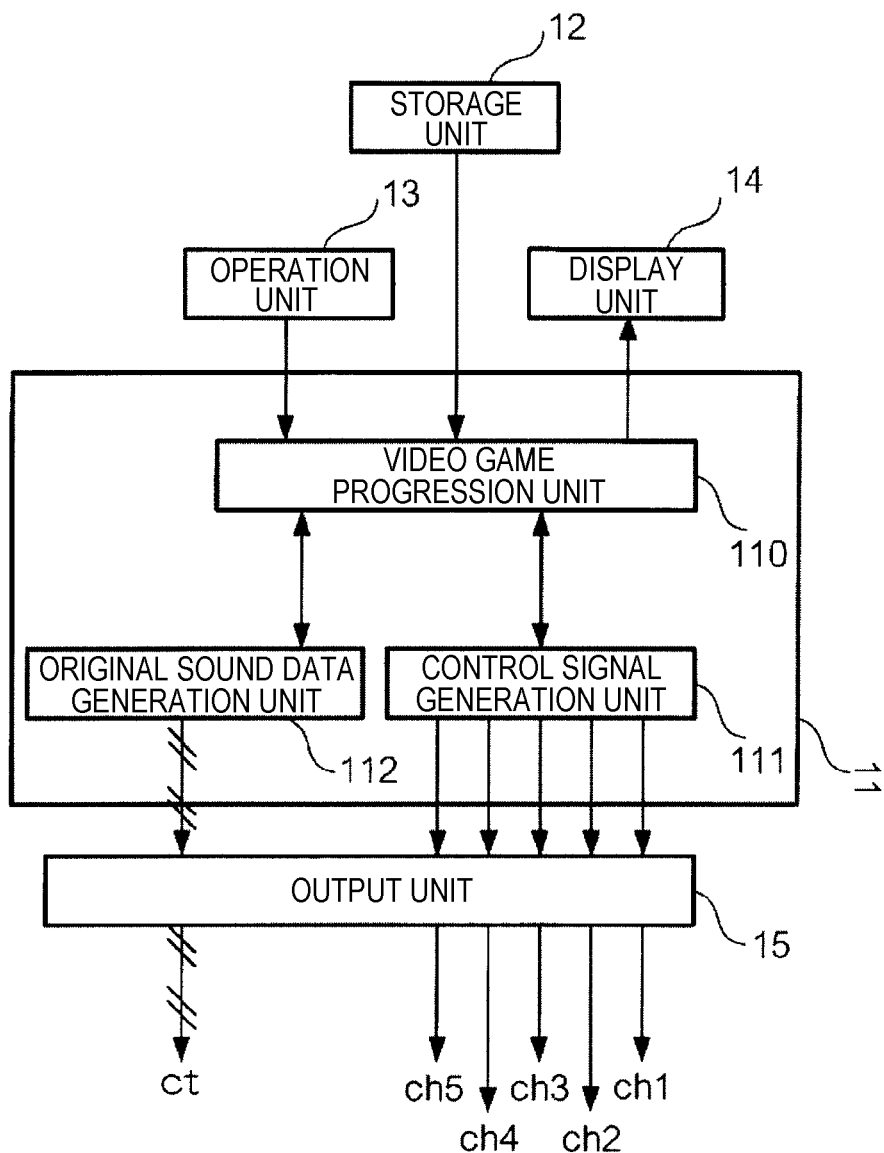
FIG. 3 is a diagram showing the functional configuration of the video game machine 1.

FIG. 3 is a diagram showing the functional configuration of the video game machine 1. The control unit 11 reads and executes the video game program 121 (see FIG. 2) stored in the storage unit 12 to function as the video game progression unit 110, the original sound data generation unit 111, and the control signal generation unit 112. The video game progression unit 110 progresses the video game in accordance with user operation along the video game program 121. That is, the video game progression unit 110 functions as a video game progressing section that is adapted to progress the video game in accordance with user operation. Specifically, the video game progression unit 110 reads configuration information of the video game stored in the storage unit 12, and determines the progress of the video game, the allocation of the operation signal, or the like in accordance with the configuration information. The video game progression unit 110 interprets the operation signal indicating user operation received by the operation unit 13 and progresses the video game. The video game progression unit 110 reads video data indicating video according to the progress of the video game from the storage unit 12, sends video data to the display unit 14, and displays video according to video data on the display unit 14. The video game progression unit 110 reads sound data to be used in the video game from the storage unit 12 in accordance with the progress of the video game.

The original sound data generation unit 111 individually generates sound data (hereinafter, referred to as original sound data) indicating original sound on the basis of sound data read by the video game progression unit 110. The term "original sound" means a sound as a basis for a processed sound to be heard by the user of the video game in accordance with the progress of the video game, and includes, for example, BGM, ambient sound, voice, system sound, and the like. BGM (Background Music) is music for increasing the emotion of the user. Ambient sound is sound, such as the footstep of a game character operated by the user or sound of wind and rain, which expresses a virtual space in the video game. Voice is voice of a game character which appears in the video game. System sound is sound for causing the user to recognize that the operation unit 13 receives operation, and includes, for example, clicking sound, chime sound, and the like. The original sound data generation unit 111 functions as a generator that is adapted to generate original sound data indicating original sound in accordance with user operation. In this case, in particular, the original sound data generation unit 111 functions as original sound data generator that is adapted to generate original sound data according to the progress of the video game progressed by the video game progressing section.

The output unit 15 packetizes a plurality of pieces of original sound data generated by the original sound data generation unit 111, and outputs the packets to the audio processor 2 by means of the individual channels. Accordingly, the output unit 15 functions as an original sound data output section that is adapted to output original sound data generated by the generator from any channel of a plurality of channels.

The control signal generation unit 112 generates a control signal which describes each attribute of each piece of original sound data in association with each communication path in the output unit 15 of each piece of original sound data generated by the original sound data generation unit 111. The attribute is information which designates how original sound indicated by original sound data is heard by the user, and specifically, a parameter indicating the content of processing. The parameter is defined in accordance with the progress of the video game. Accordingly, the control signal generation unit 112 functions as a generator that is adapted to generate a parameter indicating the content of processing on original sound data in accordance with user operation. In this case, in particular, the control signal generation unit 112 functions as a generator that is adapted to generate a parameter indicating a content of processing on original sound data according to the progress of the video game progressed by the video game progressing section.

In order to process original sound data in accordance with the parameter, various kinds of information in the audio processor 2, such as the position or low-frequency reproduction ability of each speaker (or a sound emission device) in a sound emission unit 24 of the audio processor 2 described below. For this reason, the video game machine 1 uses the output unit 15 to packetize a plurality of pieces of original sound data generated by the original sound data generation unit 111 and to output the packets to the audio processor 2 by means of the channels ch1 to ch5 without processing original sound data, and also to output the control signal generated by the control signal generation unit 112 to the audio processor 2 by means of the channel ct in association with a plurality of pieces of original sound data. The association is made by means of a time stamp included in the control signal and a time stamp used when packetizing each piece of original sound data. Accordingly, the output unit 15 functions as a control signal output section that is adapted to output the control signal which includes the parameter indicating the content of processing on original sound data and the correspondence relationship between the parameter and the channel for original sound data to be processed by means of the parameter.

1-4. Configuration of Control Signal

FIG. 4 is a diagram showing an example of a control signal which is transmitted from the channel ct of the output unit 15. As shown in FIG. 4, the control signal describes the time stamp indicating the timing at which the control signal should be applied and parameter indicating four attributes of the type, localization, reverberation rate, and bit rate defined for each channel.

Here, the type refers to the type of original sound indicated by original sound data, and specifically includes BGM, ambient sound, voice, system sound, and the like.

The localization is the direction in which the user feels that there is a sound generation point. For example, 0 degree is the front direction of the user, and one circle to the left side (that is, a counterclockwise direction when viewed from above the head of the user) from the front direction is expressed in 360 degrees.

The reverberation rate is a value indicating the intensity of reverberation, which is a sound effect of applying reverberation to sound such that the user feels the width of the space, and when the volume of original sound as a basis is 100%, expresses the ratio of volume of reverberant sound applied to original sound in percentage. As the percentage is high, strong reverberation is applied, and the user feels the width of the space. The reverberation rate may be corrected by the audio processor described below in accordance with the audio characteristics of a room where the user listens to sound of the video game.

The bit rate expresses the amount of information per second of sound included in original sound data with the number of bits, and indicates quality of original sound data.

For example, in the control signal shown in FIG. 4(a), the time stamp is t=0.0 second, the type of original sound data which is transmitted from the channel ch1 is BGM(L), and the localization is 45 degrees. In regard to original sound data which is transmitted from the channel ch5, the type is VO (voice), the localization is 0 degree, and the bit rate is 64 kbps.

1-5. Configuration of Audio Processor

Figure 5:
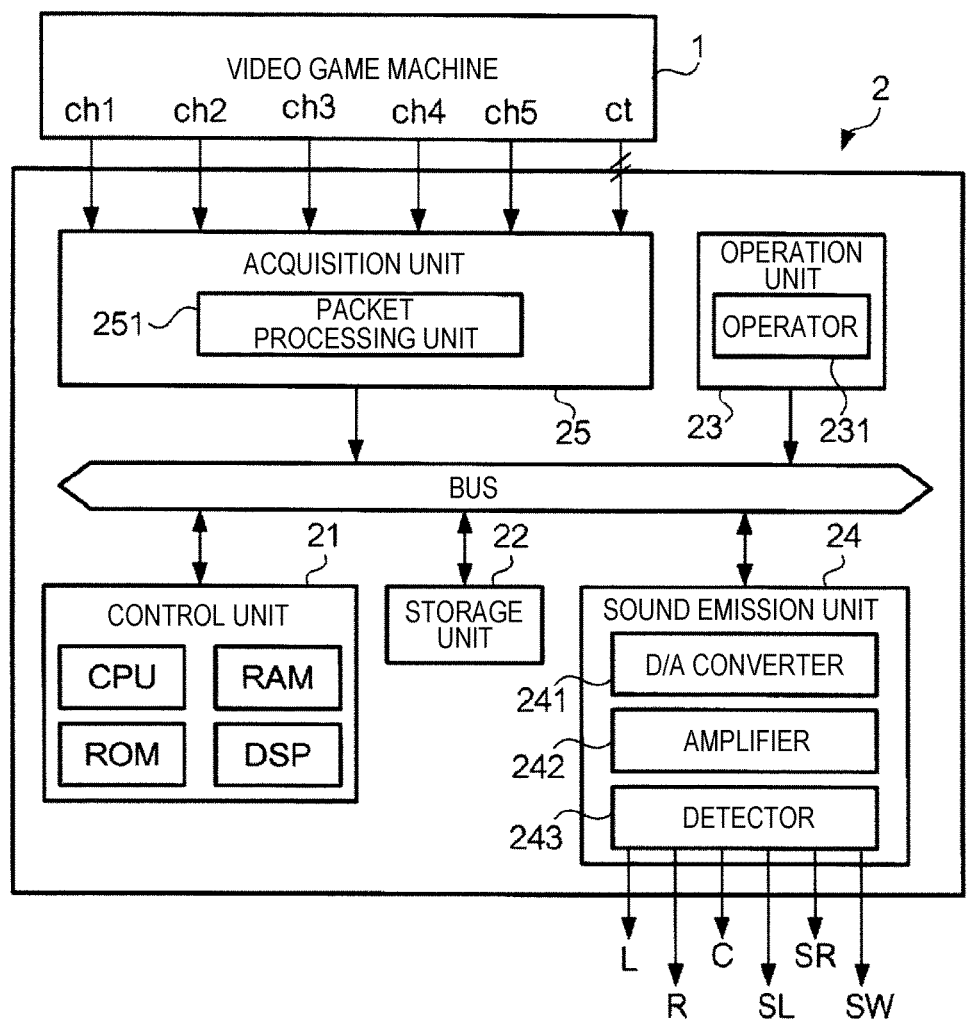
FIG. 5 is a diagram showing the configuration of an audio processor 2.

FIG. 5 is a diagram showing the configuration of the audio processor 2. A control unit 21 has a CPU, a ROM, and RAM, and controls the respective units of the audio processor 2 by the CPU which reads and executes a boot loader stored in the ROM or a control program stored in a storage unit 22 on the RAM. The control unit 21 includes a DSP (Digital Signal Processor) which processes original sound data acquired through an acquisition unit 25 on the basis of the acquired control signal. Specifically, the DSP improves sound quality of original sound indicated by original sound data, applies a sound effect, such as reverberation, to the original sound, or performs calculation for determining the localization of the original sound. Here, although the DSP is realized by hardware different from the CPU, the DSP may be realized by the CPU which executes a program. The control unit 21 functions as, for example, an interpretation unit 210 described below or the like.

The storage unit 22 is high-capacity storage means, such as a hard disk drive, and stores a control program which is read into the control unit 21. The storage unit 22 may be a recording medium, such as an external nonvolatile memory. In this case, the storage unit 22 is connected to the audio processor 2 through a connection interface (not shown) or the like.

An operation unit 23 includes an operator 231 which gives various instructions. The operation unit 23 receives user operation and supplies an operation signal according to the operation content to the control unit 21.

The acquisition unit 25 has a packet processing unit 251. The packet processing unit 251 acquires a plurality of packets individually sent from the channel ch1 to ch5, extracts divided original sound data from each acquired packet, and combines the divided original sound data to acquire original sound data. That is, the acquisition unit 25 having the packet processing unit 251 functions as an original sound data acquirer that is adapted to acquire original sound data indicating original sound from any channel of a plurality of channels.

The acquisition unit 25 acquires the control signal including the parameter of the attribute of each piece of original sound data described in association with each channel of original sound data transmitted from the video game machine 1. That is, the acquisition unit 25 functions as a control signal acquirer that is adapted to acquire the control signal which includes the parameter indicating the content of processing on the original sound data and the correspondence relationship between the parameter and the channel for the original sound data to be processed by means of the parameter. The time stamp included in the header of the original packet is associated with the acquired original sound data. Accordingly, the DSP of the control unit 21 searches for original sound data associated with a time stamp corresponding to the time stamp described in the control signal or a time stamp indicating the time after the time indicated by the time stamp, and processes the original sound data on the basis of the control signal to generate processed sound data indicating a processed sound. That is, the control unit 21 functions as a processing section that is adapted to process original sound data acquired from each channel according to the content of processing indicated by the parameter associated with the channel by means of the control signal acquired by the control signal acquirer.

The sound emission unit 24 includes a D/A converter 241, an amplifier 242, and six output terminals. The D/A converter 241 converts processed sound data generated by the control unit 21 to analog data to acquire a processed sound. The amplifier 242 amplifies the acquired processed sound. The six output terminals are respectively connected to the six speakers (L, R, C, SL, SR, SW) on a one-to-one basis, and processed sound amplified by the amplifier 242 is transmitted to any one of the speakers and emitted. The six speakers are based on Dolby AC-3 (Registered Trademark), and function as a plurality of completely separate sound sources (sound sources corresponding to six channel signals in total of front left and right and central main signals L, R, and C, left and right surround signals SL and SR, and a subwoofer signal SW). The sound emission unit 24 includes a detector 243 which detects the directions in which the six speakers are placed centering on the position of the user. Information regarding the direction of each speaker detected by the detector 243 is transferred to the control unit 21. Specifically, the detector 243 detects the directions in which the six speakers are placed centering on the position of the user. For example, the detector 243 acquires test sound using a sound acquirer placed at a listening point to calculate the disposition of the speakers from the delay time of the sound or the attenuation ratio of sound intensity or emits an infrared ray or the like toward a reflecting seal attached to the speaker while revolving from the listening point to measure the distance and angle, thereby detecting the direction in which each speaker is placed.

1-6. Functional Configuration of Audio Processor

Figure 6:
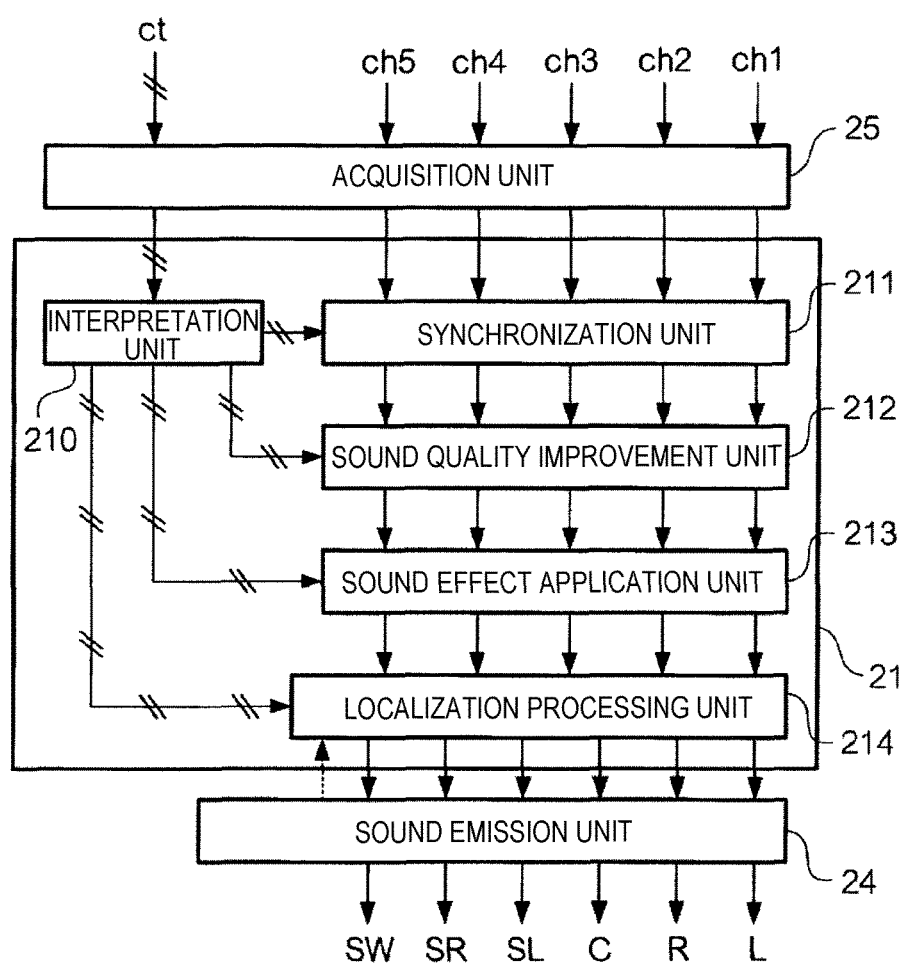
FIG. 6 is a diagram showing the functional configuration of the audio processor 2.

FIG. 6 is a diagram showing the functional configuration of the audio processor 2. The control unit 21 reads and executes a control program stored in the storage unit 22 to function as an interpretation unit 210, a synchronization unit 211, a sound quality improvement unit 212, a sound effect application unit 213, and a localization processing unit 214. The interpretation unit 210 interprets the control signal acquired by the acquisition unit 25 through the channel ct. That is, the interpretation unit 210 reads the time stamp included in the control signals and sends the time stamp to the synchronization unit 211. The synchronization unit 211 searches for original sound data associated with a time stamp corresponding to the time stamp sent from the interpretation unit 210 or a time stamp indicating the time after the time indicated by the time stamp from among original sound data reconstructed from the packet using the packet processing unit 251 of the acquisition unit 25. The synchronization unit 211 performs time adjustment of subsequent calculation processing such that the searched original sound data is emitted at the timing indicated by the time stamp.

The interpretation unit 210 reads the bit rate value, reverberation rate, and localization of original sound data transferred through the channels ch1 to ch5 and included in the control signal, and sends these values to the sound quality improvement unit 212, the sound effect application unit 213, and the localization processing unit 214.

The sound quality improvement unit 212 acquires the bit rate value of original sound data transferred through the channels ch1 to ch5 from the interpretation unit 210, and specifies the type of sound quality improvement processing corresponding to each bit rate value with reference to a correspondence table of the bit rate value stored in the RAM and the type of sound quality improvement processing. The specified type of sound quality improvement processing is performed on original sound data to generate sound data (first processed sound data) indicating a first processed sound.

The sound effect application unit 213 acquires the reverberation rate of each piece of generated first processed sound data from the interpretation unit 210, and performs reverberation processing at the reverberation rate. That is, the reverberation at the reverberation rate is applied to the first processed sound data generated by the sound quality improvement processing unit 212 to generate sound data (second processed sound data) indicating a second processed sound.

The localization processing unit 214 acquires the localization of each piece of generated second processed sound data from the interpretation unit 210, and with reference to information relating to the positions of the six speakers acquired in progress from the sound emission unit 24, sets the volume of sound to be emitted from each of the six speakers such that the sound image is located at the localization. Accordingly, the localization processing unit 214 generates sound data (referred to as third processed sound data) indicating a third processed sound based on the second processed sound data.

The third processed sound data is converted to amplified analog sound signals by the D/A converter 241 and the amplifier 242 of the sound emission unit 24, and the analog sound signals are respectively sent to the six speakers. Each speaker emits sound in accordance with the sent analog sound signal.

All of the sound quality improvement unit 212, the sound effect application unit 213, and the localization processing unit 214 to be realized by the control unit 21 are an example of a processing section that is adapted to process original sound data acquired from any channel according to the content of processing indicated by the parameter associated with the control signal acquired by the control signal acquirer.

2. Operation

Next, the operation of the audio system 9 will be described on the basis of the control signal shown in FIG. 4 as an example.

The video game progression unit 110 reads a plurality of pieces of video data and sound data from the storage unit 12 along the video game program 121 to start the video game, and if the control signal shown in FIG. 4(a) is generated by the control signal generation unit 112, the output unit 15 transmits the generated control signal to the audio processor 2. If the control signal is received, the audio processor 2 searches for each piece of original sound data reconstructed from the packet corresponding to the time stamp (t=0.0) of the control signal, and processes each piece of original sound data on the basis of the control signal. For example, original sound which is transferred through the channel ch1 is localized at an angle of 45 degrees from the user, the reverberation of 12% is applied, and sound quality improvement processing associated with 128 kbps is performed.

Next, when 2.5 seconds have elapsed from the start of the video game, the control signal shown in FIG. 4(b) is generated by the control signal generation unit 112. When received the control signal, the audio processor 2 searches for and processes each piece of original sound data at t=2.5. A portion indicated by a thick frame in FIG. 4(b) is a portion which is changed from the control signal at t=0.0. Specifically, the localization and reverberation rate of the channel ch3 and the localization of the channel ch5 are changed.

Accordingly, for example, at the time of t=2.5 seconds, original sound which is transferred through the channel ch3 is localized at an angle of 30 degrees from the user, the reverberation of 12% is applied, and sound quality improvement processing associated with 64 kbps is performed.

Next, when 10.0 seconds have elapsed from the start of the video game, the video game machine 1 is temporarily in a state where operation is not received from the operation unit 13. For example, for the time for explaining the story in the video game or the standby time for loading the video game program 121 corresponding to the next stage, the video game machine 1 does not receive any operation excluding the operator 131 for force-quit, and BGM is played as a motion image or a letter screen is displayed on the display unit 14. At this time, since the game character on the video game does not have a talk, and ambient sound is not generated, the channel ch3 which is heretofore allocated to "SE" as ambient sound or the channel ch4 which is heretofore allocated to "SYS" as operation sound is empty. Accordingly, the video game progression unit 110 allocates BGM to all of the channels ch1 to ch4, sets the localization of the channel ch3 to 135 degrees, and sets the localization of the channel ch4 to −135 degrees.

For example, when the video game machine executes video game software, such as a roll-playing game, a game character, words which are spoken by the game character, how sound echoes, and the direction in which sound is heard change depending on the progress of the video game, such as selection of a member who goes with the game character, selection of a dungeon, or selection of the direction of the face of the game character. There are various ways to listen to sound depending on the type of the sound, and if a sound effect is applied without exception, unintended sound may be heard by the user.

In the audio system 9, as described above, the control signal including unprocessed original sound data and the parameter indicating the content of processing on the original sound data is sent to the audio processor 2, and the original sound data is processed by the audio processor 2 on the basis of the corresponding parameter, thereby emitting each of a plurality of types of sound in accordance with the audio environment of the individual user.

3. Modifications

Although the embodiment has been described, the content of the embodiment may be modified as follows. Further, the following modifications may be combined.

(1) Although in the foregoing embodiment, the output unit 15 transmits original sound data as PCM data to the channels ch1 to ch5, compressed original sound data may be transmitted. In this case, the control signal may include information indicating a compression format or a compression rate of original sound data transmitted through each channel.

(2) Although in the foregoing embodiment, the output unit 15 packetizes original sound data using the packet processing unit 151 as it is, encryption may be performed before packetization. For example, the output unit 15 may include a processor which performs encryption processing based on the HDCP (High-bandwidth Digital Content Protection) protocol, and the encryption function may be realized by the CPU. In this case, a mechanism for decrypting codes may be provided in the acquisition unit 25 of the audio processor 2.

(3) Although in the foregoing embodiment, the detector 243 of the sound emission unit 24 detects the directions in which the six speakers are placed centering on the position of the user, the detector may detect information other than the direction of each speaker, may replace or add the information with the information of the direction, and may transfer the resultant information to the control unit 21.

For example, the detector may detect low-frequency reproduction ability or the like of the speakers and may transfer information indicating the low-frequency reproduction ability or the like to the control unit 21. In this case, the control unit 21 may localize the sound image on the basis of the transferred information. Specifically, in a standard configuration, when there is no speaker which should be placed at a certain position, the control unit 21 may control the sound emission unit 24 such that a plurality of speakers placed near compensate for the sound volume for the nonexistent speaker. The ratio of the sound volume of a low-frequency component to be sorted into the subwoofer may be determined in accordance with the low-frequency reproduction ability of each speaker.

(4) Although in the foregoing embodiment, the control signal generation unit 112 generates the control signal which describes the parameters of all attributes for original sound data output from all channels for each time stamp, a control signal which describes only a parameter for original sound data output from a channel with change may be generated. That is, only a portion indicated by a thick frame in FIGS. 4(*b*) and 4(*c*) may be transmitted to the audio processor 2 as a control signal in association with each time stamp. In this case, the audio processor 2 may not change channels and parameters which are not included in the transmitted control signal.

(5) Although in the foregoing embodiment, a configuration in which original sound data is transmitted to the audio processor 2 is the video game machine 1, a configuration other than the video game machine may be provided. For example, a reproducer which reproduces a motion image recorded in a DVD video or the like may be provided. In this case, the reproducer switches video to be displayed in accordance with user operation, and switches the control signal corresponding to each piece of original sound data to be transmitted to the audio processor 2 in accordance with user operation. For example, where there is video data captured at a multi-angle, the localization of each piece of original sound data may be calculated in accordance with an angle selected by the user, and the control signal including the calculated localization may be transmitted to the audio processor 2. Accordingly, when it is assumed that the face of the user is directed at the angle selected by the user, the audio processor 2 can localize each piece of original sound in a direction in which each original sound should be heard.

(6) Each program which is executed in the control unit 11 of the video game machine 1 and the control unit 21 of the audio processor 2 may be provided in the form of being stored in a computer-readable recording medium, such as a magnetic recording medium, for example, a magnetic tape or a magnetic disk, an optical recording medium, such as an optical disk, a magneto-optical recording medium, or a semiconductor memory. The program may be downloaded through a network, such as Internet. In regard to the control unit 11 and the control unit 21, various devices other than the CPU may be applied as control means illustrated by the CPU, and for example, a specialized processor or the like may be used.

(7) Although in the foregoing embodiment, the video game machine 1 has the display unit 14 which displays video according to the progress of the video game, the video game machine 1 may not have the display unit 14. For example, the video game machine 1 may execute video game software which deals with sound and does not display video, or may include a video terminal which is connected to an external display device and through which a video signal is supplied to a display device.

(8) Although in the foregoing embodiment, the sound emission unit 24 includes the six output terminals, the output terminals are respectively connected to the six speakers on a one-to-one basis, and so-called 5.1ch surround sound emission is realized, more output terminals or less output terminals may be provided. For example, output terminals corresponding to the 7.1ch system or the 2.1ch system may be provided.

(9) Although in the foregoing embodiment, the control signal generation unit 112 generates the parameter indicating the content of processing on original sound data according to the progress of the video game, the video game machine 1 may generate the parameter on the basis of information acquired from the audio processor 2. In this case, the control unit 11 of the video game machine 1 has channels (hereinafter, referred to as acquisition channels) through which data is acquired from the audio processor 2, as well as the channels through which data is output to the audio processor 2. The control unit 11 acquires the sound emission conditions, such as the number of speakers of the sound emission unit 24 of the audio processor 2, the position, or low-frequency reproduction ability, of the sound emission device which is forced to emit sound by the audio processor 2 through the acquisition channels. That is, the control unit 11 functions as a sound emission condition acquirer that is adapted to acquire the sound emission conditions of the sound emission device, which is forced to emit sound by the audio processor, from the audio processor as an output destination to which the original sound data output section outputs original sound data.

The control signal generation unit 112 may determine the content of processing according to the sound emission conditions acquired from the acquisition channels, and may generate the parameter.

For example, when the sound emission conditions acquired from the acquisition channels describe that no speakers corresponding to left and right surround speakers are prepared in the audio processor 2, the control signal generation unit 112 may determine the content of processing on original sound data such that necessary sound output is constituted only by front speakers as speakers disposed on the front center, left, and right sides. Accordingly, processing which does not necessarily obtain desired effects is avoided, thereby producing stable sound.

In the above-described case, the control signal generation unit 112 can change control with the prospect that sound which is highly likely to be output to the left and right surround speakers is subjected to virtual processing (signal processing such that it is perceived as if there are speakers at the back by the two front speakers) in the audio processor 2. Accordingly, the control signal generation unit 112 removes an unfavorable frequency band such that the localization at the back is perceived or provides processed sound data indicating processed sound for virtual processing in progress, for example, intentionally provides a phase difference between the left and right sides to increase a sense of width, thereby obtaining optimum effects.

When the sound emission conditions acquired from the acquisition channels describe that the low-frequency reproduction ability of the left and right surround speakers is lower than a threshold value, the control signal generation unit 112 may extract processed sound, which is likely to be emitted using the left and right surround speakers, using a low-pass filter, and may determine the content of processing on original sound data such that sound is emitted to the subwoofer. Accordingly, when moving the sound image, it is possible to avoid the occurrence of a sense of discomfort with a sense of direction in the middle-high range and the low range depending on the low-frequency reproduction ability of the speakers.

In short, the video game machine 1 may function as an information processor including a sound emission condition acquirer that is adapted to acquire the sound emission conditions of the sound emission device, which is forced to emit sound by the audio processor, from an audio processor as a destination to which original sound data output section outputs original sound data, and a generator that is adapted to generate the parameter in accordance with the sound emission conditions acquired by the sound emission condition acquirer and user operation.

Various configurations may be applied when the video game machine 1 acquires the device sound emission conditions of the sound emission device, which is forced to emit sound by the audio processor 2, from the audio processor 2 through the acquisition channels. As such as configuration, for example, (i) a configuration in which, when the video game machine 1 is connected to the audio processor 2 or when the parameter is generated, a request signal indicating a request for the device sound emission conditions is sent to the audio processor 2, and the audio processor 2 sends a reply signal indicating the device sound emission conditions as a reply to the request signal, (ii) a configuration in which the device sound emission conditions detected by the audio processor 2 are output to the video game machine 1 in advance when being connected to the video game machine 1, (iii) a configuration in which the device sound emission conditions detected by the audio processor 2 are output to the video game machine 1 at a regular interval, or the like may be made.

That is, the audio processor 2 may function as an audio processor including an original sound data acquirer that is adapted to acquire original sound data indicating original sound from an information processor through any channel of a plurality of channels, a control signal acquirer that is adapted to acquire a control signal which includes a parameter indicating the content of processing of original sound data and the channel of original sound data to be processed by means of the parameter, a processing section that is adapted to process an original sound data acquired from the channel according to the content of processing indicated by the parameter associated with the channel by means of the control signal acquired by the control signal acquirer, and a condition output section that is adapted to output, to the information processor, the sound emission conditions when processed sound data obtained by processing the original sound data using the processing section is emitted to a sound emission device.

(10) Although in the foregoing embodiment, the video game progression unit 110 progresses the video game according to user operation along the video game program 121, the content of the video game program 121 may be, for example, as follows.

The video game program 121 describes a virtual space, and a game character and a sound generating object disposed in the virtual space. Data which express the virtual space, the game character, and the sound generating object is stored in the RAM of the control unit 11 when the video game program 121 is read and executed by the control unit 11. If received user operation, the video game progression unit 110 performs calculation according to the operation to change data on the RAM. Accordingly, the game character in the virtual space is operated in accordance with user operation, and the video game is progressed. The operated game character takes a posture according to user operation in the virtual space or moves to a position according to the operation.

For a game character which is disposed in the virtual space, the listening position where sound emitted in the virtual space is heard is defined. The original sound data generation unit 111 calculates and generates original sound data indicating original sound set for a sound generating object based on the relationship between the listening position defined for the game character and the sound generating object disposed in the virtual space. The output unit 15 packetizes a plurality of pieces of original sound data calculated and generated by the original sound data generation unit 111, and outputs the packets to the audio processor 2 by means of the individual channels. The control signal generation unit 112 generates a control signal which includes a parameter indicating the content of processing of each piece of original sound data in association with each channel in the output unit 15 of each piece of original sound data. The parameter is determined in accordance with the progress of the video game and user operation, and how the user listens to original sound indicated by the original sound data is designated by means of the parameter. The output unit 15 outputs the generated control signal to the audio processor 2.

(11) Although in the foregoing embodiment, the output unit 15 transmits original sound data to the channels ch1 to ch5, the number of channels through which original sound data is transmitted is not limited to five. The number of channels may be equal to or smaller than four or may be equal to or greater than six.

REFERENCE SIGNS LIST

1: video game machine, 11: control unit, 110: video game progression unit, 111: original sound data generation unit, 112: control signal generation unit, 12: storage unit, 121: video game program, 13: operation unit, 131: operator, 14: display unit, 15: output unit, 151: packet processing unit, 2: audio processor, 21: control unit, 210: interpretation unit, 211: synchronization unit, 212: sound quality improvement unit, 213: sound effect application unit, 214: localization processing unit, 22: storage unit, 23: operation unit, 231: operator, 24: sound emission unit, 241: D/A converter, 242: amplifier, 243: detector, 25: acquisition unit, 251: packet processing unit, 9: audio system

The invention claimed is:

1. An information processor configured to be connected to an audio processor through a plurality of channels in parallel, the information processor comprising:
   a generator that is configured to generate original sound data indicating an original sound as a basis for a processed sound to be heard by a user and a parameter indicating a content of processing on the original sound data;
   an original sound data output section that is configured to output the original sound data generated by the generator from some channels of the plurality of channels; and
   a control signal output section that is configured to output a control signal in parallel with the original sound data from a channel of the plurality of channels other than the channels from which the original sound data is output, the control signal including the parameter indicating the content of processing on the original sound data and a correspondence relationship between the parameter and at least one of the channels from which the original sound data to be processed by way of the parameter is output; and a video game progressing section that is configured to progress a video game, wherein the generator is configured to generate the original sound data according to a progress of the video game progressed by the video game progressing section and the parameter for the original sound data, and wherein the information processor and the audio processor are separate and discrete units.

2. The information processor according to claim 1, wherein the generator is configured to generate plural pieces of original sound data, and an individual parameter indicating a content of processing on each piece of original sound data, and the original sound data output section is configured to output the plural pieces of original sound data generated by the generator to respective channels.

3. The information processor according to claim 1, wherein the video game progressing section is configured to progress the video game depending on user's operation.

4. The information processor according to claim 1, further comprising:

a sound emission condition acquirer that is configured to acquire sound emission conditions of a sound emission device, which is forced to emit sound by an audio processor, the sound emission conditions being acquired from the audio processor serving as an output destination at which the original sound data output section outputs the original sound data, wherein the generator is configured to generate the parameter depending on the sound emission conditions acquired by the sound emission condition acquirer and the progress of the video game.

5. An audio processing system, comprising an information processor and an audio processor connected to each other through a plurality of channels in parallel, wherein the information processor includes:

a generator that is configured to generate original sound data indicating an original sound as a basis for a processed sound to be heard by a user and a parameter indicating a content of processing on the original sound data;

an original sound data output section that is configured to output the original sound data generated by the generator from some channels of the plurality of channels; and a control signal output section that is configured to output a control signal in parallel with the original sound data from a channel of the plurality of channels other than the channels from which the original sound data is output, the control signal including the parameter indicating the content of processing on the original sound data and a correspondence relationship between the parameter and at least one of the channels from which the original sound data to be processed by way of the parameter is output, and the audio processor includes:

an original sound data acquirer that is configured to acquire the original sound data through the channels from the original sound data output section of the information processor;

a control signal acquirer that is configured to acquire the control signal from the control signal output section of the information processor via the channel other than the channels from which the original sound data is acquired; and a processing section that is configured to process the original sound data acquired from the at least one channel according to the content of processing indicated by the parameter associated with the at least one channel by way of the control signal acquired by the control signal acquirer.

6. A non-transitory computer-readable storage medium in which is stored a program which causes a computer of an information processor, configured to be connected to an audio processor through a plurality of channels in parallel, to function as:

a generator that is configured to generate original sound data indicating an original sound as a basis for a processed sound to be heard by a user and a parameter indicating a content of processing on the original sound data;

an original sound data output section that is configured to output the original sound data generated by the generator from some channels of the plurality of channels;

a control signal output section that is configured to output a control signal in parallel with the original sound data from a channel of the plurality of channels other than the channels from which the original sound data is output, the control signal including the parameter indicating the content of processing on the original sound data and a correspondence relationship between the parameter and at least one of the channels from which the original sound data to be processed by way of the parameter is output; and a video game progressing section that is configured to progress a video game, wherein the generator is configured to generate the original sound data according to a progress of the video game progressed by the video game progressing section and the parameter for the original sound data, and wherein the information processor and the audio processor are separate and discrete units.

7. A non-transitory computer-readable storage medium in which is stored a video game program which causes a computer of a video game machine, configured to be connected to an audio processor through a plurality of channels in parallel, to function as:

a video game progressing section that is configured to operate a game character in a virtual space depending on user's operation to progress a video game;

an original sound data generator that is configured to calculate and generate original sound data indicating an original sound as a basis for processed sound to be heard by the user set for a sound generating object based on a relationship between a hearing position set in correspondence with the game character and the sound generating object disposed in the virtual space;

a parameter generator that is configured to generate a parameter indicating a content of processing on the original sound data generated by the original sound data generator in accordance with the progress of the video game progressed by the video game progressing section;

an original sound data output section that is configured to output the original sound data generated by the original sound data generator from some channels of the plurality of channels; and a control signal output section that is configured to output a control signal in parallel with the original sound data from a channel of the plurality of channels other than the channels from which the original sound data is output, the control signal including the parameter indicating the content of processing on the original sound data and a correspondence relationship between the parameter and at least one of the channels from which the original sound data to be processed by way of the parameter is output.

* * * * *